US008943144B2

(12) United States Patent
Farrell et al.

(10) Patent No.: US 8,943,144 B2
(45) Date of Patent: Jan. 27, 2015

(54) CONSOLIDATING DUPLICATE MESSAGES FOR A SINGLE DESTINATION ON A COMPUTER NETWORK

(75) Inventors: Robert G. Farrell, Hawthorne, NY (US); Peter K. Malkin, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 12/634,795

(22) Filed: Dec. 10, 2009

(65) Prior Publication Data

US 2011/0142071 A1 Jun. 16, 2011

(51) Int. Cl.
*G06F 15/16* (2006.01)
*H04L 12/58* (2006.01)

(52) U.S. Cl.
CPC .............. *H04L 12/586* (2013.01); *H04L 51/16* (2013.01)
USPC ......................................... 709/206; 709/207

(58) Field of Classification Search
USPC .................................................. 709/206, 207
See application file for complete search history.

(56) References Cited

U.S. PATENT DOCUMENTS

| 5,974,236 | A | 10/1999 | Sherman |
| 7,406,537 | B2 | 7/2008 | Cullen |
| 2005/0027779 | A1* | 2/2005 | Schinner ........................ 709/200 |
| 2006/0031324 | A1* | 2/2006 | Chen et al. ..................... 709/206 |
| 2008/0162643 | A1* | 7/2008 | Flach ............................. 709/206 |
| 2009/0313101 | A1* | 12/2009 | McKenna et al. ........... 705/14.25 |
| 2010/0017487 | A1* | 1/2010 | Patinkin ........................ 709/206 |
| 2010/0070584 | A1* | 3/2010 | Chen et al. ..................... 709/206 |
| 2010/0076989 | A1* | 3/2010 | Jakobson ...................... 707/758 |
| 2012/0093421 | A1* | 4/2012 | Kletter .......................... 382/209 |
| 2013/0262438 | A1* | 10/2013 | Palay ............................. 707/722 |

OTHER PUBLICATIONS

Jin et al., "Relational Subscription Middleware for Internet-Scale Publish-Subscribe," ACM Digital Library, 2003.
Kleinsen, "Simple Mail Transfer Protocol," ACM Digital Library, 2001.
Pinho et al., "Reliable Real-Time Communications in CAN Networks," DIALOG/CSA, IEEE Transactions on Computers, Dec. 2003, pp. 1594-2607, v 52, n 12.

* cited by examiner

*Primary Examiner* — Thanh Tammy Nguyen
*Assistant Examiner* — Jonathan Bui
(74) *Attorney, Agent, or Firm* — Scully, Scott, Murphy & Presser, P.C.; Nidhi Garg, Esq.

(57) ABSTRACT

Consolidating duplicate messages, in one aspect, may receive a transmission, and compute the difference between the transmission and a previous transmission. The previous transmission may be modified to include an indication of the difference.

22 Claims, 11 Drawing Sheets

CONSOLIDATING DUPLICATE MESSAGES FOR A SINGLE DESTINATION ON A COMPUTER NETWORK

FIELD

The present disclosure relates to computer systems and computer networks, and more particularly to consolidating duplicate messages for a single destination on a computer network.

BACKGROUND

People using e-mail, voicemail, or other messages often receive nearly the same message from multiple sources. For example, on the Internet, messages of little value to the receiver (spam) are forwarded to many destinations. Also, people often have multiple e-mail addresses or change e-mail addresses frequently. Thus, users may receive the same e-mail in multiple inboxes. Duplicate messages reduce the productivity of the workforce by forcing them to examine messages to determine if they are duplicates. Duplicate messages also use storage space, network bandwidth, and processing time, reducing the efficiency of the messaging system and raising the cost of operating a messaging network.

An existing manual solution to the problem is to institute policies about who can send certain types of e-mail. Another manual solution is for receivers to notify all but one sender that they are receiving duplicates or unsubscribe from mailing lists, but this only works when the duplicate messages are being sent repeatedly. These methods and others that rely on user compliance are error prone, ineffective, expensive, difficult to implement, and often not applicable. Another existing solution is to run a program to find duplicates within the messaging storage system on a client within a client-server system. However, messages are often not exactly duplicated because they are forwarded, come from difference sources, have a signature or other sender annotations, etc. Yet another existing solution, typically used for attachments, is to detect and store the duplicates of attachments on the server. However, users still receive and must read multiple e-mails, just with a reference to the duplicate content. Also, this only works for attachments and of email messages in general.

BRIEF SUMMARY

A method and system for providing consolidated communications are provided. The method, in one aspect, may include receiving a transmission and computing difference between the transmission and a previous transmission. The method may also include and storing an indication of the difference between the transmission and previous transmission.

A system for providing consolidated communications, in one aspect, may include a module operable to compute difference between the transmission and a previous transmission. The module may be also operable to store an indication of the difference between the transmission and previous transmission.

A program storage device and/or a computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure in one aspect describes finding near-duplicates of messages destined for the same address and consolidating those messages into one. Indications of the differences between or among the near-duplicate messages also may be provided. If the user has not read or otherwise consumed the message, the user will only see a single message. The metadata (also referred to as headers or fields) and/or the body of the message can be modified based on the body and/or headers of the similar previous messages. For example, the number of similar messages could be reflected in the title. For each similar message, header information and/or body with similarities or differences highlighted can be concatenated, attached, threaded, or otherwise associated or combined with the original message.

The Mail RFC 822 standard, for example, allows mail to be sent from multiple users, so one can add to the "From:" header. If the user has already read the message and additional near-duplicates are detected, an indication can be given to the user such as changing the status of the message to unread, changing the metadata such as changing the title to indicate the number of new unread messages, and/or modifying the body of the message such as highlighting only the unread differences.

A method in one aspect may provide consolidated communications, for instance, by receiving a transmission and calculating the difference between the new transmission and a previous one. The previous transmission may include an indication of the differing new content. Any of the previous transmissions may be analyzed to determine if they contain the same data or portions of same data as the new transmission. In another aspect, the previous transmission may be combined or merged with the new transmission, for instance, if the portions of the data overlap in content. The combining may include concatenating, attaching, threading, or adding to a group, or others or any combinations thereof.

Examples of the transmission may include, but are not limited to an electronic mail (E-mail), instant messaging (IM), and text messaging (on mobile phones). The differences in the messages may include, but are not limited to added data, modified data, deleted data, added senders, added recipients, transmission time/date, added metadata (number of bytes of data), modified metadata, or others or combinations thereof.

Indications of the differing new content may be given, for example, by changing of previous transmission status (e.g., to unread), highlighting the differing new content (e.g., highlighting new senders), reordering the content (e.g., putting the differing new content first), creating a grouping, or others, or combinations thereof.

Furthermore, the new transmission may be deleted, for instance, after having been combined with the previous one, or for example, if it is the same as the previous message. Summaries or reports may be provided, for example, that show, incremental changes, a chronological list of the senders, message times/dates, the number of transmissions, metadata, or others, or combinations thereof. In addition, a log of all consolidations may be created and saved. The consolidated transmissions may be electronically signed, for instance, to enable verification for validity and security. In one aspect, it is possible to specify or select the parameters that should be consolidated. An example may be a rule that specifies, "only consolidate notes that were forwarded by sender X."

Figure 1:
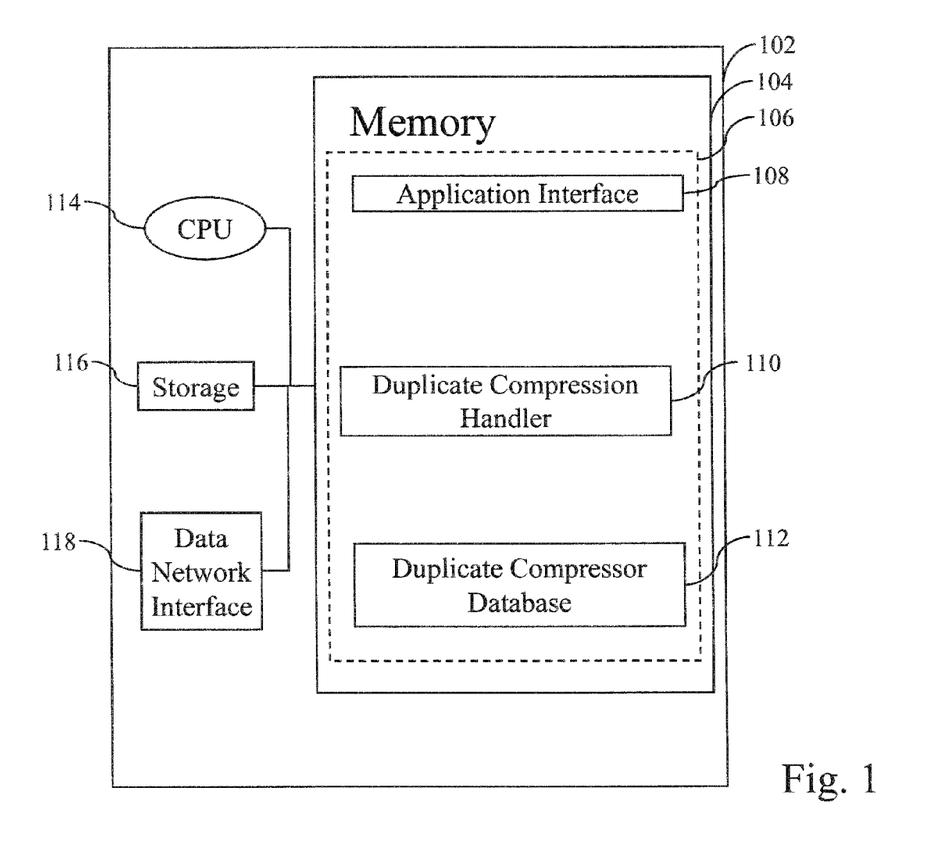
FIG. 1 is a block diagram illustrating components of a system that detects and compresses duplicate messages in one embodiment of the present disclosure.

FIG. 1 is a block diagram illustrating components of a system that detects and compresses duplicate messages in one embodiment of the present disclosure. A system 102 may be a computer system that may include any computing node that is able to load and execute programmatic code, for example, but not limited to, the ThinkPad® or PowerPC® product sold by IBM, for instance, running the operating system and server application suite sold by Microsoft, e.g., Windows® XP, or a Linux operating system. The system logic may be embodied as computer executable code that is loaded from a remote source (e.g., from a network file system), local permanent optical (CD-ROM), magnetic storage (such as disk), or storage 116 into memory 104 for execution by CPU 114. The system 102 also may include a network interface 118, for communicating to other network accessible services. Such an interface 118 may include, but is not limited to a hardwired device, e.g., Ethernet over coax cable, wireless IP, and telephone to IP (VoIP), such as that provided by the DVG-1402S Broadband Phone Service VoIP Router from D-Link®. The memory 104 may include computer readable instructions, data structures, program modules and application interfaces providing logic or functional components 106 such as application interface 108, duplicate compression handler 110, and duplicate compressor database 112.

It should be understood that while FIG. 1 illustrates the functional components residing in a computer system component 102, the system and method of the present disclosure is not limited to only that configuration. Thus, the components may be distributed over a network on different platforms in a distributed environment, and/or configured in a cloud computing environment. Further, while FIG. 1 shows a CPU 114, the system may include multiple processors and/or cores.

An application interface 108 may be a graphical user interface that renders messages, including messages in a consolidated manner.

Duplicate compressing handler 110 may reduce or compress the message into a list of identified parts.

Duplicate compressor database 112 may include data and data structure that store information about the messages and compressed messages.

Figure 2:
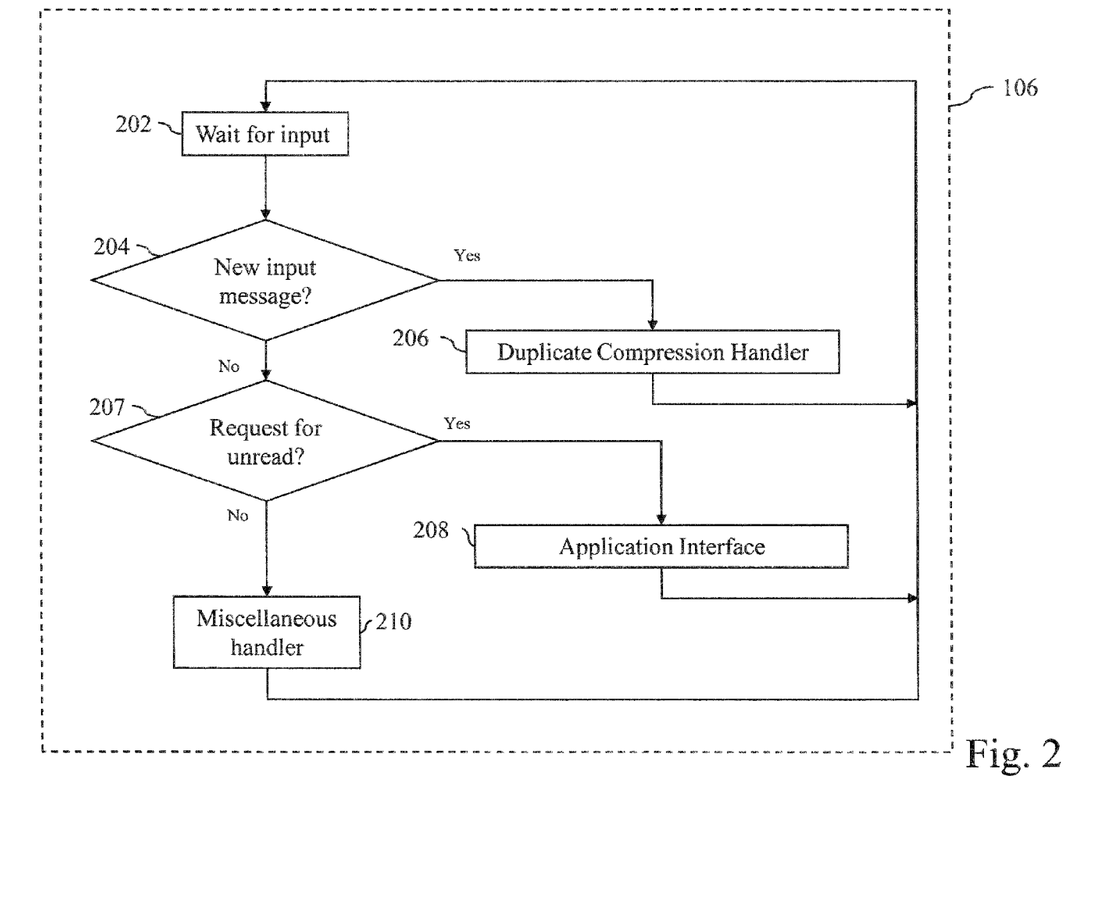
FIG. 2 is a flow diagram illustrating a functional flow of the system of the present disclosure in one embodiment.

FIG. 2 is a flow diagram illustrating a functional flow of the system of the present disclosure in one embodiment. The logic shown in FIG. 2 may intercept messages received by a message handler of the system before it is transmitted to the user. At 202, the system waits for an input. At 204, it is determined whether the input is a message. If the input is a message, a duplicate compression handler (e.g., 110 in FIG. 1) described in detail with reference to FIGS. 3-6B is invoked at 206. If the handler 110 finds similar messages, it creates a structure of parent-child relationship of the messages, for example, a linear structure. There may be multiple children. Further, a tree structure may be created to represent the relationships among the messages. Following the completion of the duplicate compression handler at 206, control continues at step 202.

If the input is not a message, at 207 it is determined whether the input is a request for unread messages. If so, then at step 208, the application interface 108 is invoked, which retrieves and returns renderings of all unread messages from the database 112, including consolidated messages composed of new messages merged with previous messages. Following the completion of the application interface at 208, control continues at step 202 where the logic awaits another input.

If step 207 determines that the input is not a request for unread messages, the logic proceeds to step 210 where a miscellaneous handler for handling other logic is invoked, following which the logic waits for another input at step 202.

Figure 5A:
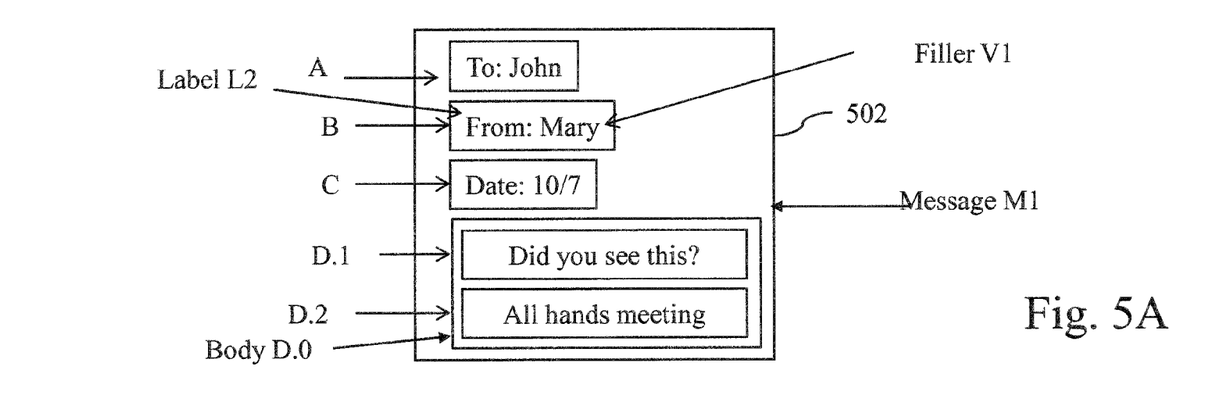
FIG. 5A shows an example message and 5B shows a partially duplicate message of the example message shown in FIG. 5A.
Figure 5B:
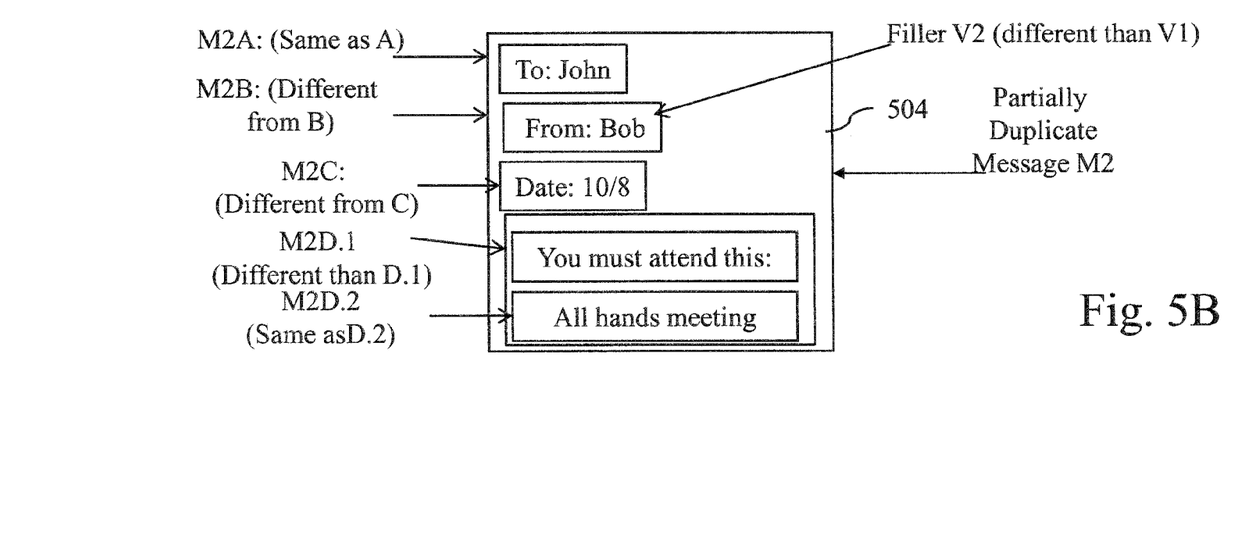
Figure 5C:
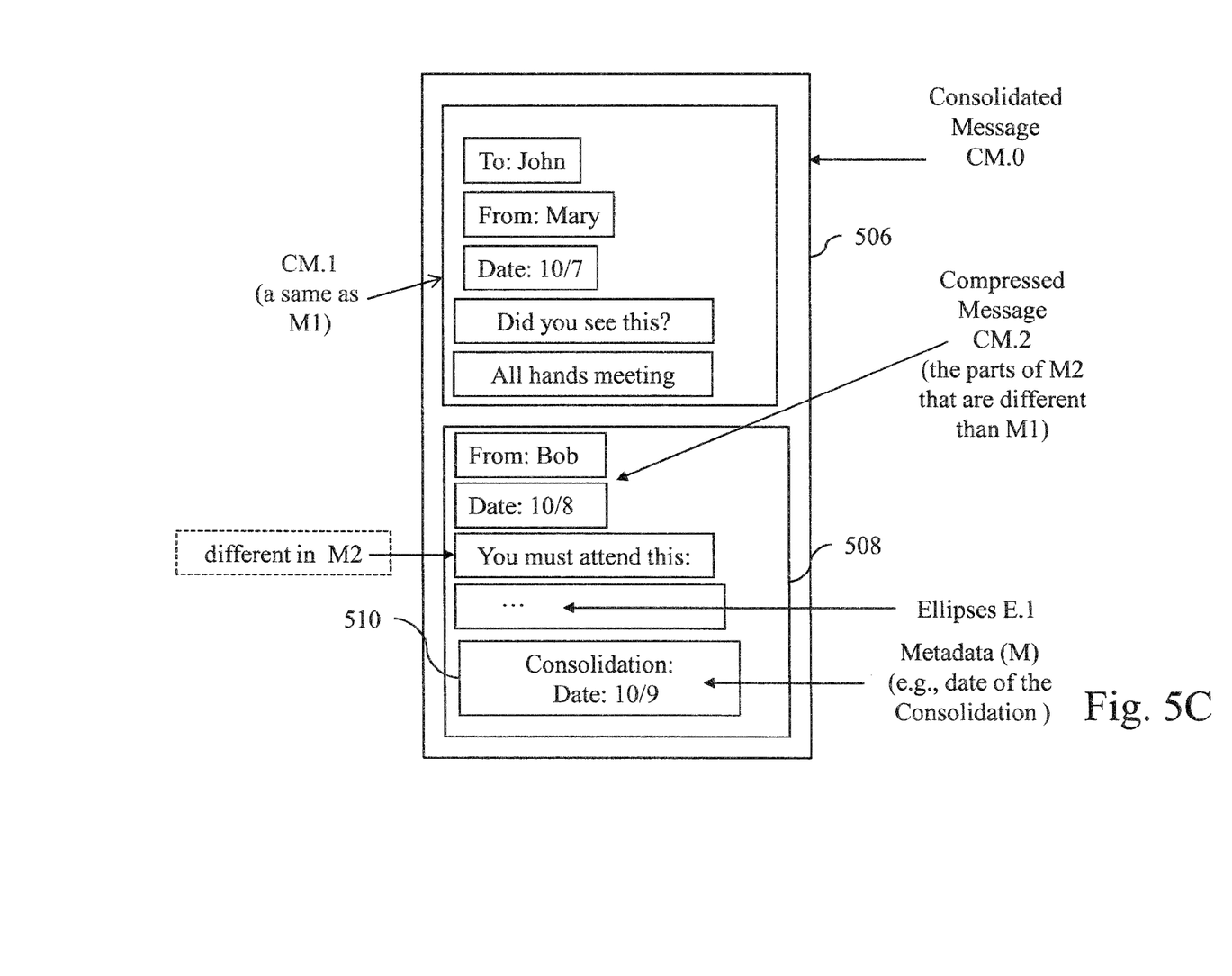
FIG. 5C shows a consolidated message that consolidates the messages shown in FIG. 5A and FIG. 5B.

FIG. 5A shows an example message and 5B shows a partially duplicate message of the example message shown in FIG. 5A. FIG. 5C shows a consolidated message that consolidates the messages shown in FIG. 5A and FIG. 5B. The differences in message M1 (502) in FIG. 5A and message M2 (504) in FIG. 5B are identified and message M2 is compressed. The consolidated message (506) in FIG. 5C includes message M1 (502) and compressed message M2 (508). A consolidated message may also include metadata that includes information about the messages. For example, the metadata shown at 510 includes the date of consolidation. Other information may be included in the metadata portion of the consolidated message.

Figure 6A:
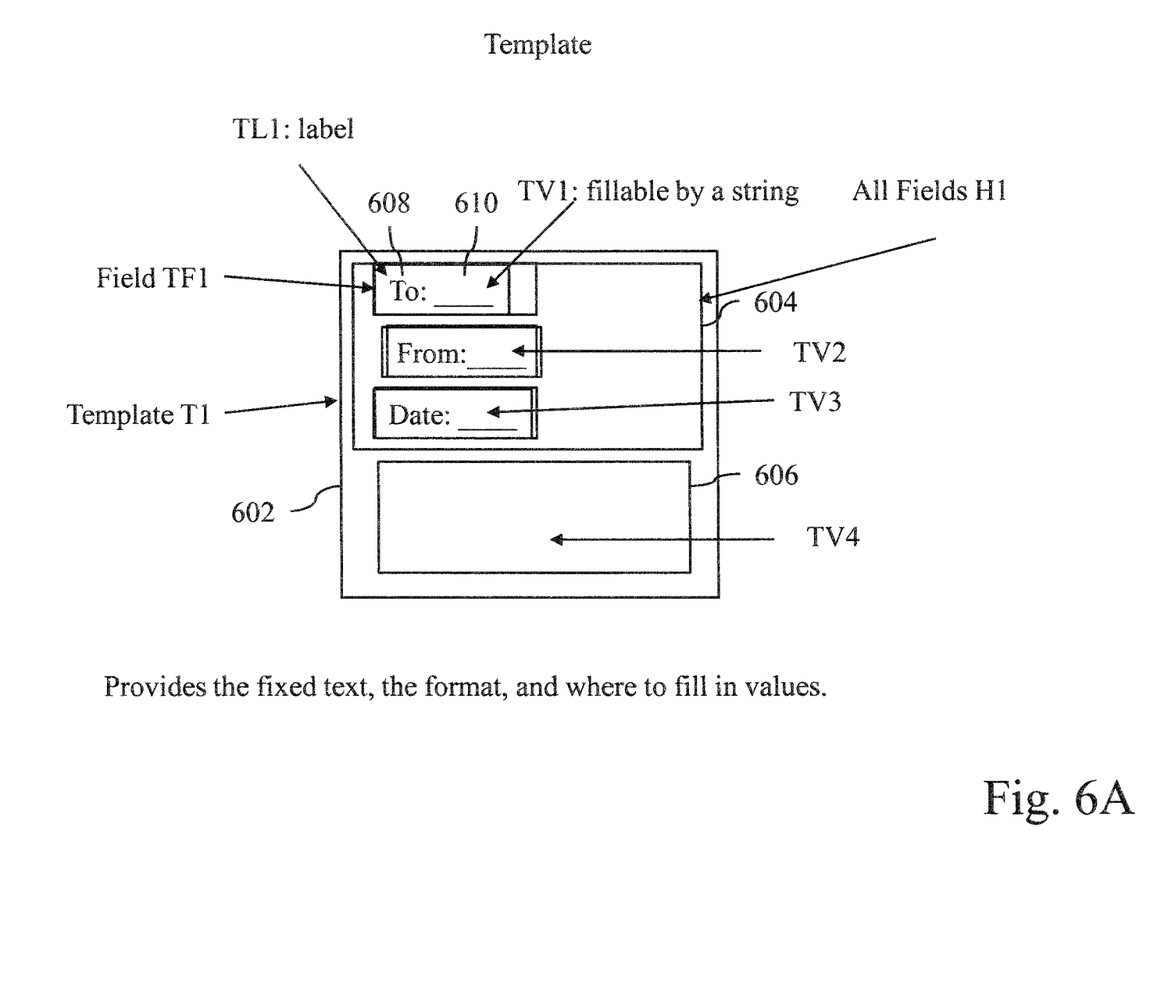
FIG. 6A shows an example template that may be used for detecting similar messages.
Figure 6B:
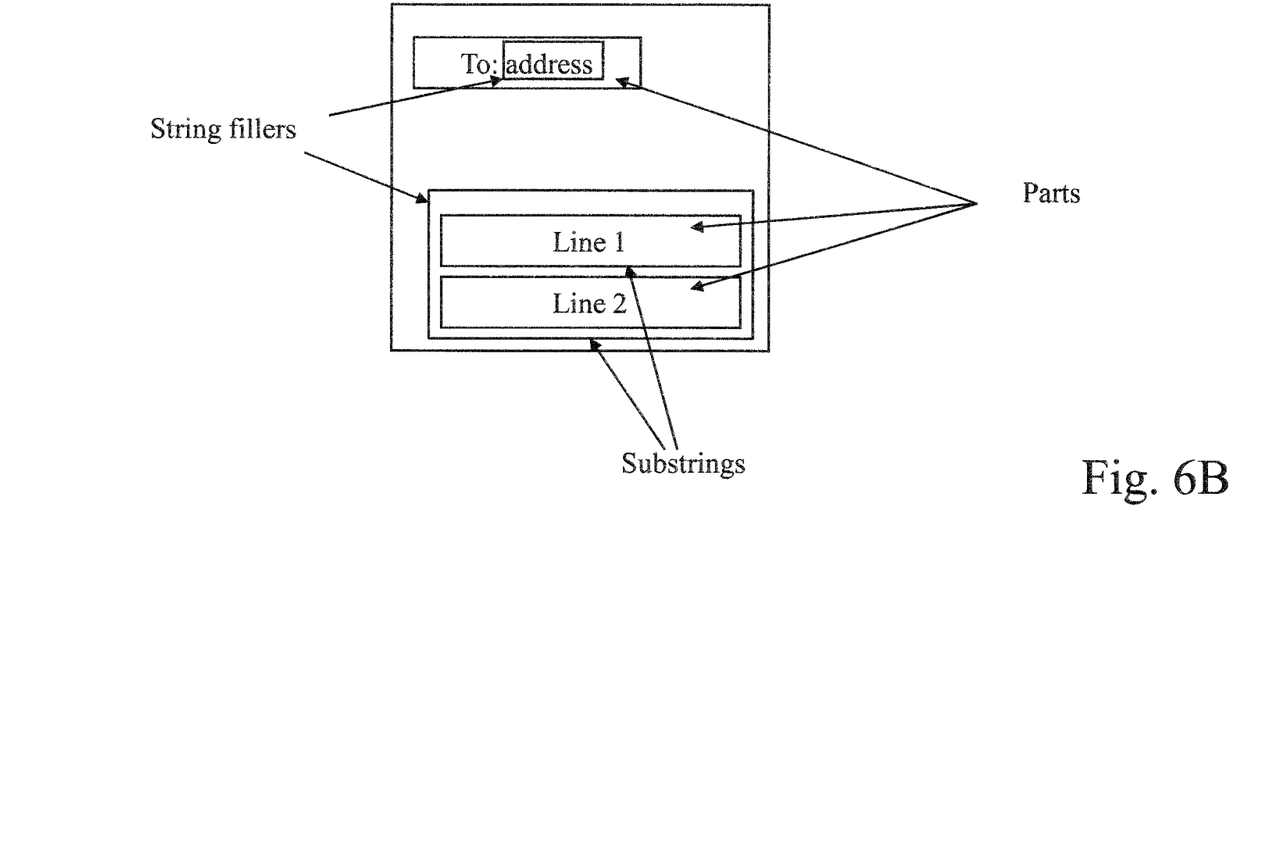
FIG. 6B shows a message with string values used to fill the template of FIG. 6A.

FIG. 6A shows an example template that may be used for detecting similar messages. The template 602 provides the fixed text, the format, and where to fill in values. For instance, the template may include a header part 604 and a body part 606. The header part 604 may include fields with label 608 and fillable part 610, for example, fillable with a string value. Examples of fields in the header part 604 may include, but are not limited to, "to" field, "from" field, "date" field, "cc" field, "bcc" field, "subject" field, etc. The template 602 may be filled with corresponding values from a message shown in FIG. 6B.

The following tables or like data structure may be used in detecting similar messages and/or generating a compressed message. Table 1, referred to herein as a message table stores references to substrings in the message and may include "all", "same", and "diff" columns. Each row in the table may hold the substrings found in a single message. The "all" column stores a list of identifiers for substrings in the table (e.g., Table 2). The "Same" column stores a list of identifiers for substrings in the substring table such that, if a given message is listed as a child of a parent in the consolidated messages table, then the "Same" column lists the identifiers of the strings that are the same between the parent and child. For example, in the messages table, message 1 shares substring 1 with message 2. The "Diff" column stores a list of identifiers for substrings in the substring table such that, if a given message is listed as a child of a parent in the consolidated messages table, then the "Diff" column lists the identifiers of the strings that are different between the parent and the child.

The substrings in the "All" column may be sufficient to recreate the input message[#] from a template 602 or like data structure.

The "status" column indicates whether the message is read or unread. In this example, a status of 1 indicates a status of read and a status of 0 indicates a status of unread. Any other symbols or values may be used to indicate the status.

TABLE 1

Messages:

| Message identifier | All | Same | Diff | Status |
|---|---|---|---|---|
| 1 | 4, 5, 7, 1, 2 | | | 1 |
| 2 | 4, 6, 8, 3, 2 | 4, 2 | 6, 8, 3 | 0 |

Table 2, referred to herein as a substrings table specifies substrings. Substrings table stores the parsed substrings in the messages and indexes or maps each substring to an identifier. "Messages" column of the substrings table identifies the message that includes the substring. Thus, for example, according to the example shown in Table 2, substring "Did you see this?" has substring identifier "1" and is part of the message having message identifier 1. Similarly, substring "All hands meeting" has substring identifier "2" and is included in both messages, i.e., the message identified by message identifier "1" and the message identified by message identifier "2."

TABLE 2

Substrings:

| Substring identifier | Substring | Messages |
|---|---|---|
| 1 | Did you see this? | 1 |
| 2 | All hands meeting | 1, 2 |
| 3 | You must attend this: | 2 |
| 4 | John | 1, 2 |
| 5 | Mary | 1 |
| 6 | Bob | 2 |
| 7 | 10/7 | 1 |
| 8 | 10/8 | 2 |

Table 3, referred to herein as a consolidated messages table may include a message identifier for parent message, child message, and the consolidation date. For instance, the message having identifier "1" has a child message whose identifier is "2". This entry in the table indicates that messages 1 and 2 are similar messages, and that message 2 was consolidated into message 1. The cdate column specifies the consolidate date. Other information about a consolidated message may be included in this table.

TABLE 3

Consolidated Messages:

| Parent | Child | cdate |
|---|---|---|
| 1 | 2 | 10/9 |

Table 4, herein referred to as a filler table identifies labels for substrings. The "Value" column indicates a substring identifier that can be used to index a substring in the substrings table (Table 2). The "Messages" column indicates an identifier that can be used to index a message in the messages table (Table 1). Given a message identifier in the Messages column and a substring identifier in the Value column, one can look up a label in the Label column.

TABLE 4

Filler:

| Messages | Value | Label |
|---|---|---|
| 1 | 4 | To: |
| 1 | 5 | From: |
| 1 | 7 | Date: |
| 1 | 1 | Body: |
| 1 | 2 | Body: |
| 2 | 6 | From: |
| 2 | 8 | Date: |
| 2 | 3 | Body: |
| 2 | 2 | Body: |

Figure 3:
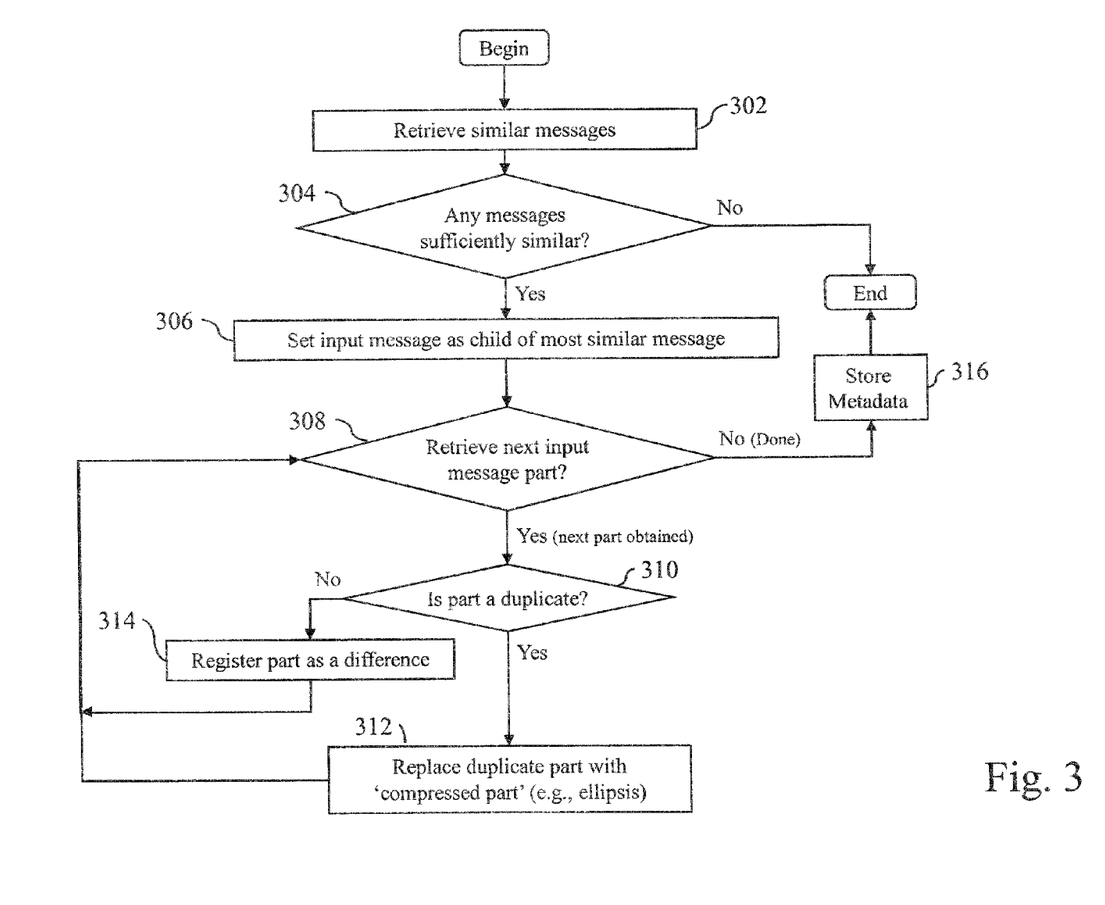
FIG. 3 illustrates a flow control of duplicate compression handler in one embodiment of the present disclosure.

FIG. 3 illustrates a flow control of duplicate compression handler (e.g., FIG. 1 at 110 or FIG. 2 at 206) in one embodiment of the present disclosure. The duplicate compression handler may reduce the message into a list of identified parts. The identified parts may be those specified in the template shown in FIG. 6A. Each part has an indication of whether it is a duplicate of or different from the "similar message." For instance, a sufficiently similar message m has an $S(m)>R$ where S is a similarity function, m is a message, and R is an application-specific threshold.

At 302, similar messages are retrieved, for instance, from a database of messages that have some commonality with the current input message. At 304, it is determined whether the similar messages retrieved at 302 are sufficiently similar, for example, meet a predetermined threshold of similarity. If it is determined that the messages are not sufficiently similar or do not meet the predetermined threshold, the logic or process ends, the current input message passes through to application interface.

In one aspect, a similarity threshold may be used to determine if messages are sufficiently similar. In this embodiment, the similarity threshold may be based on the count of the number of parts in common between the two messages. If the count is not at least some fixed percentage of the total combined number parts in the two messages, then the message is not sufficiently similar. For example, the percentage typically above 50% and 80% is a good default value. However, other similarity thresholds may be used. For instance, a weighted similarity threshold where the weights are determined by the template labels could be used. Examples of label weights include:

To: —1
From: —3
Subject—2
Body: —4

Other approaches may weight each individual word or phrase.

If it is determined that the messages are sufficiently similar, the current input message is set to have a child relationship with the similar message found in the retrieved messages at 306. If more than one similar message is found, the most similar message may be used. The consolidated messages table is updated with the similar message's identifier as the parent and the current message's identifier as the child. At least a part of the current input message thus may be compressed, for example, into nothing (i.e., the part is completely removed), an indication or ellipses that indicates that the part is removed, a compression of the original part, or a reference to corresponding part in the similar message, or any combination thereof. An application interface that receives the compressed message may use the reference to corresponding part in the similar message to reconstruct the current input message from the compressed message.

In one aspect, a table, for instance, referred to herein as a consolidated messages table may be updated to add a parent and/or child entry in the consolidated messages table. Table 3 illustrates an example of a consolidated messages table. The parent identifier identifies the similar message in the messages table or the like (e.g., Table 1); the child identifier identifies the input message in the messages table or the like (e.g., Table 1). The mapping is done by finding the string or substring in the "Substring" column of the Substrings table and looking up the list of corresponding messages in the "Messages" column of the Substring table.

At 308, next part of the input message is retrieved. For example, the parts refer to portions of the message, divided according to the structure shown in the message template (e.g., FIG. 6A). For instance, the substrings of the body 606 are parts of the message and may be retrieved. As another example, the identifier for the part in a filler table is retrieved. At 310, if it is determined that the next part is a duplicate, i.e., the same as in the similar message, the method proceeds to 312. At 312, the duplicate part is replaced with the compressed part, and the method returns to 308 to process more parts of the input message. For instance, at 312, the identifier for the part in the filler table may be stored into the "Same" column in the message table. If the part is not a duplicate, the part is logged or registered as a difference at 314. For instance, the identifier for the part in the filler table may be stored into the "Diff" column in the messages table. After processing all parts of the input message at steps 308, 310, 312, and 314, any summary data about the logged information (also referred to as metadata) is stored at 316. For instance, the current date and time may be stored into the "cdate" column of the consolidated messages table.

Figure 4:
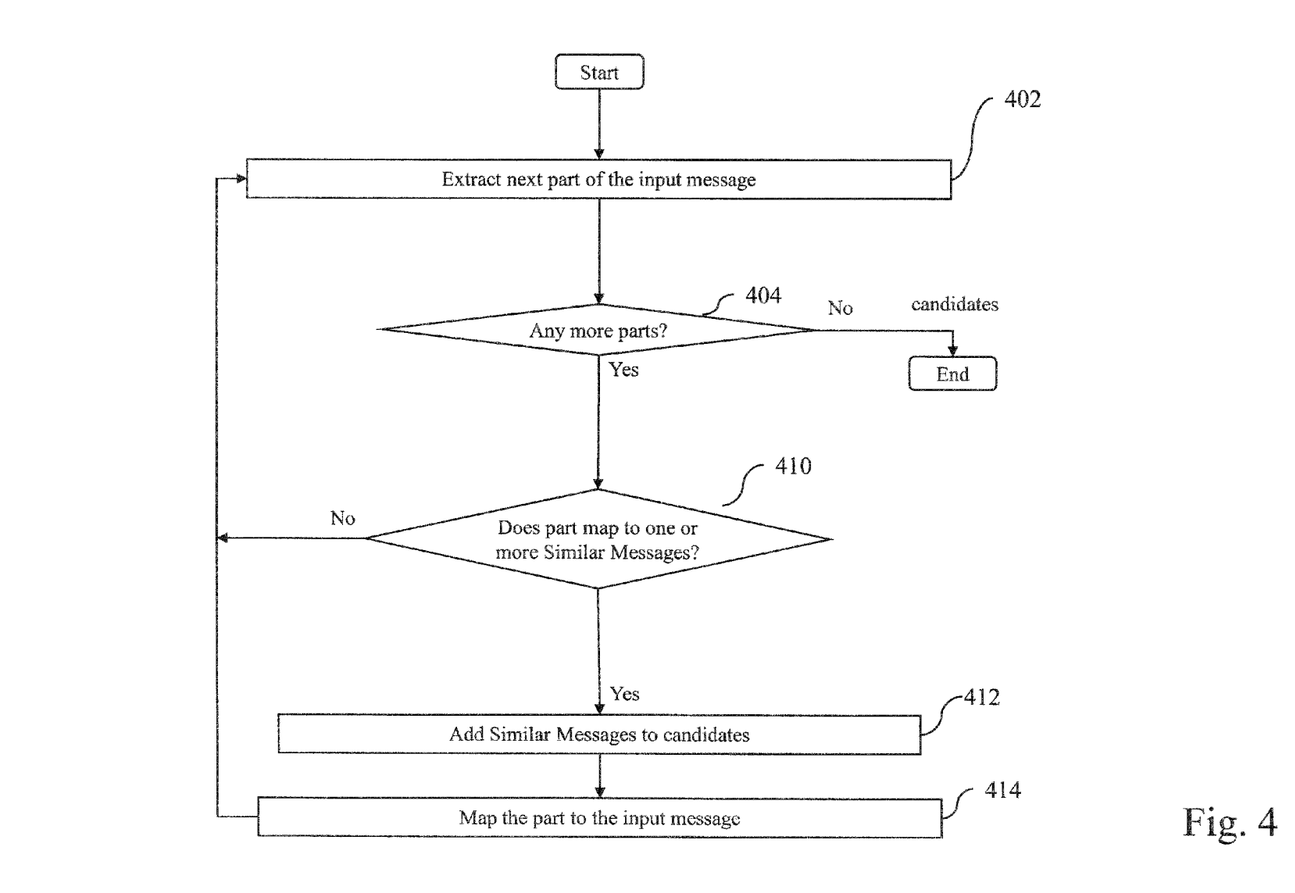
FIG. 4 is a diagram showing flow control for retrieving similar messages (e.g., FIG. 3 at 302) in one embodiment of the present disclosure.

FIG. 4 is a diagram showing a flow of control for retrieving similar messages (e.g., FIG. 3 at 302) in one embodiment of the present disclosure. At 402, the next part of the input message is extracted, for example using a template, e.g., shown at 602. Any method that extracts parts from a message may be used. A part may also be extracted by matching a label, for example, "To:", shown at 608 and then extracting the string to the end of the line of message e.g., shown at 610. Another method for extracting the next part of the input message is to extract each line of text, for example, in the body of a message, 606. However, other methods could be used such as getting the next paragraph, for example, from the body or using any number of parsing techniques known to a practitioner in the art. The template may be one of a number of templates. For instance, there may be templates for each application, each computing environment, server environment, and the like. The extracted part may be added to a substrings table. In one aspect, as shown in Table 2 and Table 4, the extracted substring may be mapped to an identifier using a substring table (Table 2). The location of the substring in a template may be determined by a label, for example, the label "To:" at 608 in FIG. 6A. A row may be added to the filler table (Table 4) with the value of the label in the label column, the mapped identifier to the extracted substring in its "value" column, and the input message identifier in the messages column. Further, the identifier of the extracted substring may be set into the ALL column of the message table (Table 1). The order of the substrings in the ALL column provides a sequence. For example, the order of the substrings appearance in the input message is a sequence.

At 404, it is determined whether there are more parts. If there are no more parts, then the list of candidates has been created and this processing ends.

When iterating over the parts of a message to look for duplicates, the entire header, for example, the "To:" address and each line of the body may be extracted as substrings. When extracting the substrings, a template may be used to extract substrings. In this embodiment, if a carriage return or linefeed character is encountered then the line is stored as a substring. In another aspect, a substring may be identified or output in response to encountering a predetermined character or word or the like. Yet in another aspect, a substring may be identified or output in response to encountering an end of a paragraph, a sentence, a phrase, a sequence of two or more words, or any other subset of the message text. Other methods of parsing may be used.

At 410, it is determined whether the-part maps to one or more similar messages. If the part maps to one or more message identifiers then the corresponding messages in the Messages table are thus similar messages. Any part of the message that is the same between an input message and a message stored in the Messages table is sufficient for the message to be a candidate. The similar messages are added to a list of candidate similar messages at 412.

At 414, the string is mapped to the input message by adding the message identifier for the input message to the Messages column of the substrings table. The method then proceeds to step 402 for the next part. At 410, if it is determined that the string does not map to one or more similar messages, e.g., by determining that the Messages column of the substrings table is empty, the method proceeds to step 402.

Figure 8:
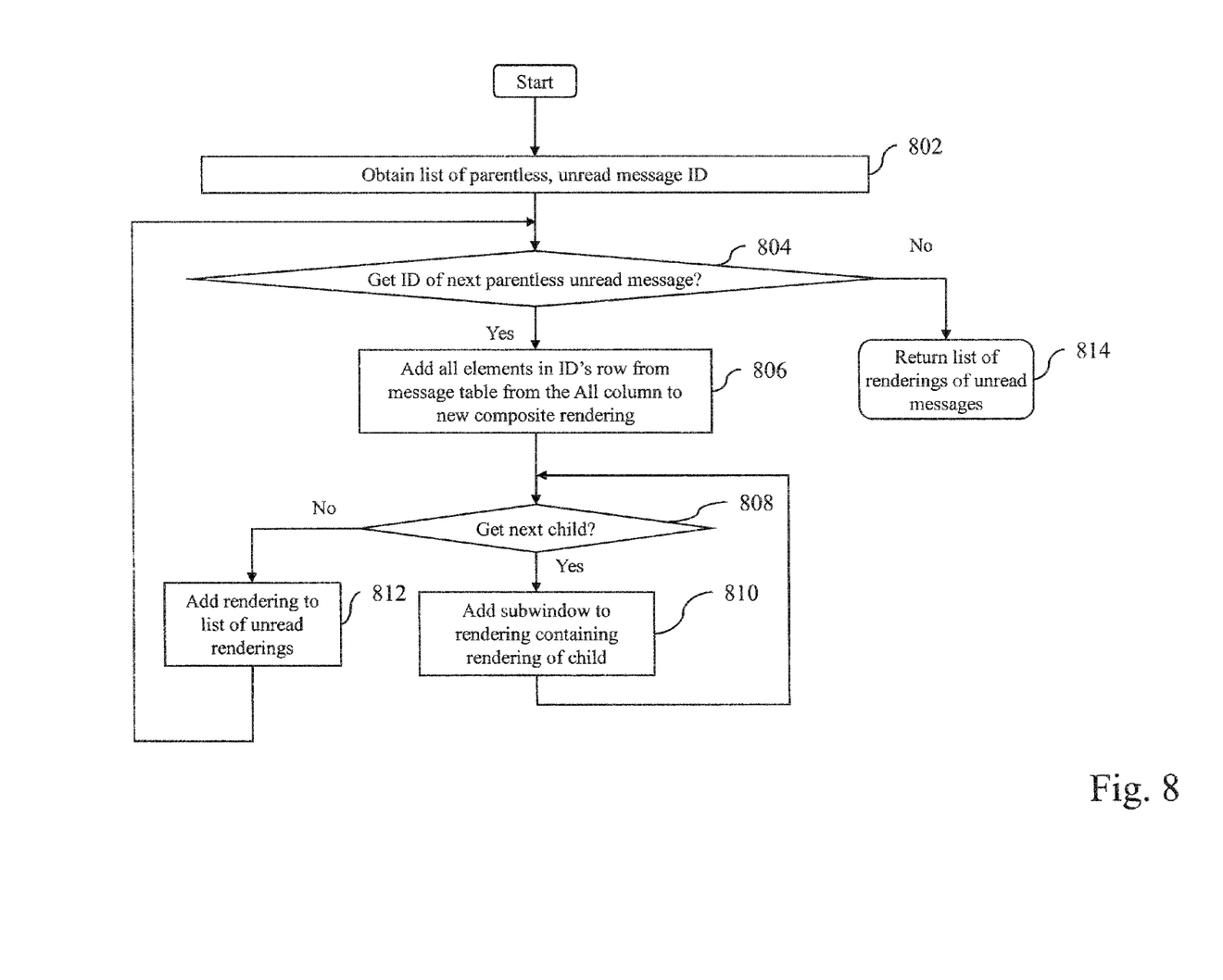
FIG. 8 is a diagram showing flow control for the application interface in one embodiment of the present disclosure.

FIG. 8 illustrates the flow control of the application interface 108, in one embodiment of the present disclosure. This routine retrieves and returns renderings of all unread messages and parent messages of any unread child messages. In one embodiment, these rendering may be textual, like from those shown in FIGS. 5A-5C. Renderings which include other sorts of elements, such as graphics, audio, video and active elements (e.g., animations) are also within the scope of the present disclosure. The renderings can also support applications other than email, such as instant messaging and others.

At step 802, a list of ID's (identifiers) from the message table (e.g., Table 1) is obtained, for messages that have no parents (i.e., who do not appear in the child column of consolidated messages table (e.g., Table 3) and that are either unread or that have a child that is unread. As mentioned above, messages that are unread have a value of 0 in the status column of the message table. The list in step 802 is obtained by checking each of the id's from the message identifier column of the messages table, and adding it to the list if and only if either the referenced message is marked as unread or if any one of its children are unread—the message ID's of all children messages listed in the consolidated message table. A person of ordinary skill in the art will appreciate that since any given child message could also have a child, this check for unread children may be performed recursively when applicable. Next, starting at step 804, each ID from this list is processed individually. When the list is exhausted, step 814 returns the created collection of renderings.

Given the next available message ID from the list, step 806 creates a new message rendering and adds to it a sequence of elements. The rendering creates a sequence of elements from the sequence of substrings in the order of their appearance in the messages table, "All" column of the messages table, constructing all of the elements of the full message. For message ID 1, for example, the All column provides a list of substring identifiers: 4, 5, 7, 1, 2. Each of these elements is added to the rendering in the order in which it is listed (e.g., for the example above, 4 is added first, then 5, etc.). The filler table provides the label (e.g., "To:") for each substring. So, for example, to create the element for a substring with identifier 4 for message ID 1, the row of the filler table that has the message column is 1 and 4 in the value column is consulted. This row is row 1 of the filler table. The element thus will get a label of "To:." Following this label will be the substring associated with the substring identifier of 4, the value of which as retrieved from the substrings table is "John". Thus, the rendering for this element would be "To: John". This comprises a typical message header, but the label can indicate any text, images, or other media to be inserted before or after the label. In some cases, the label itself may not be rendered as part of the element. For example, the "Body:" label does not appear in FIG. 6A. Furthermore, the label may be used to identify where to insert the element into a template, allowing different layouts of the message, such as tables, lists, charts, graphs, or other arrangements. In the case where a template is used, the template, filled by elements, becomes the new message rendering.

Step 808 then checks the consolidated message table to see whether the given message ID has any child message ID associated with it, processing each such child ID one by one in step 810 which invokes the child message rendering routine (described in detail with reference to FIG. 9) passing the routine the child's message ID as well as the parent message's ID. This routine creates a rendering of the child messages which can then be added (e.g., appended) as a subwindow to other renderings. FIG. 5C 508 shows an example of such a subwindow. Once all of the children message ID's are processed with their renderings added to parent message's rendering, this rendering is added to the collection of unread messages in step 812, following which control continues at step 804.

In one aspect, before the collection of unread message renderings is returned, the all of the messages may be marked as being read by setting all of the values to "1" in the status column of the message table. This may be done to indicate that since their rendering have all been provided, all messages have been read.

Figure 9:
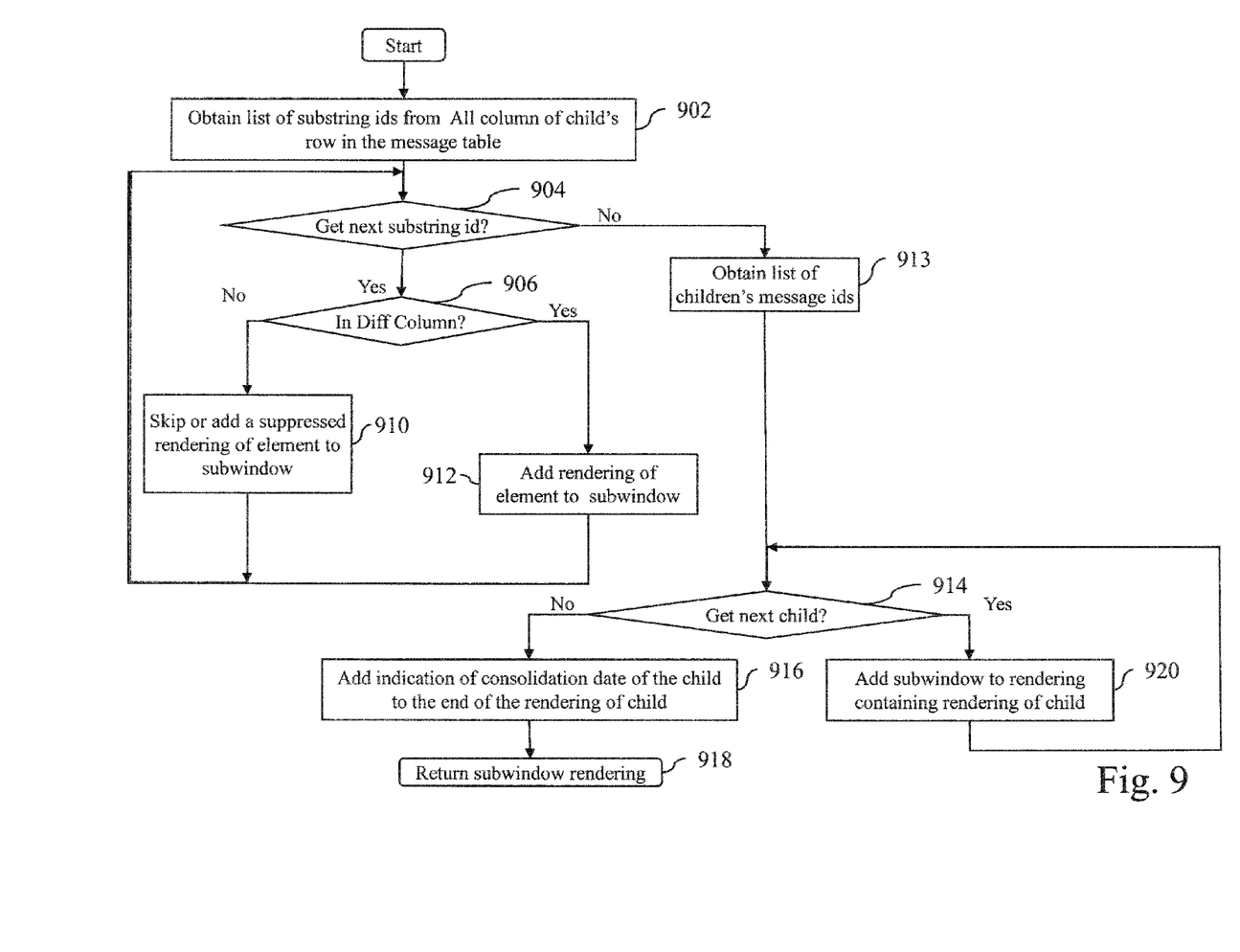
FIG. 9 is a diagram showing flow control for the Child Subwindow Creation routine in one embodiment of the present disclosure.

FIG. 9 illustrates the flow control of the child message rendering routine in one embodiment of the present disclosure. This routine is passed the message ID of a child and its parent (e.g. child message ID=2 and parent message id=1), and returns a rendering of associated child—herein referred to as subwindow—, one which can be embedded and/or appended to another, rendering. Step 902 obtains the list of the substring ids from the All column of the messages table matching the child message id. For message ID 2, this would be: 4, 6, 8, 3, 2. Step 904 attempts to take the next substring id from this list. If successful, step 906 checks whether this substring id is also contained in the message table's Diff column for the child. E.g., 6, 8, 3 for message id 2. So, for example, the first id from the All list, 4, is not contained in the Diff list, while the second id from the All list, 6, is. If the substring id is not in the Diff column, then it means that the given substring element has already been displayed in the rendering of the parent message. Step 910 then either skips adding anything to the subwindow rendering of the child, or adds indication that the display of a given redundant substring was suppressed, e.g., with an ellipse. A person of ordinary skill in the art will appreciate that this decision could be based on the label associated with the given substring id, this information indicated in the filler table. For example, substrings with a label of "To:" could be skipped, while substrings with a label of "Body:" would be replaced by an ellipse. Following step 910, control continues at step 904 where the next substring id is processed. If the check in step 906 succeeds (and the substring id is in the diff column), it means that the given associated substring has not displayed in the rendering of the parent. Thus, step 912 adds a rendering for the given substring ID to the subwindow rendering. This is similar to the process described in step 806 of FIG. 8. The string associated with the given substring id and child message id is retrieved from the Substrings table, and the label associated with the substring id and child message id is retrieved from the filler table. Following this, control continues at step 904, where the next substring ID is handled.

So, for example, for message id 2, a child of message id 1, the list of all substring ids would be 4, 6, 8, 3, 2, with 4 and 2 handled by step 910; and 6, 8, and 3 handled by step 912.

4—skipped (not in Diff column)
6—label="From:" substring="Bob"
8—label="Date:" substring="10/8"
3—substring="You must attend this" with the label skipped as described with reference to FIG. 8.
2—suppressed using " . . . " (not in Diff column)
The combined rendering would, therefore contain:
From: Bob
Date: 10/8
You must attend this: . . .

When all of the substring ids have been exhausted by step 904, step 913 obtains a list of all of the child message's children—this may be done by consulting the Consolidated Messages table (table 3) and checking for rows where the message id in the Parent column matches the child id (e.g., 2). Step 914 takes the next message if from this list, and in step 920 obtains and then adds the rendering for the associated message to the subwindow being constructed. This may be done by invoking the routine being described here (with reference to FIG. 9), passing the current child message id (e.g., 2) and the child's-child id obtained in step 914. When all such child-children messages have been added to the subwindow rendering, step 916 adds an indication of the date the child was consolidated to the rendering, e.g., as shown at 510, FIG. 5C. This date may be retrieved from the consolidated messages table's "cdate" column. Following this, the subwindow rendering is returned in step 918.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
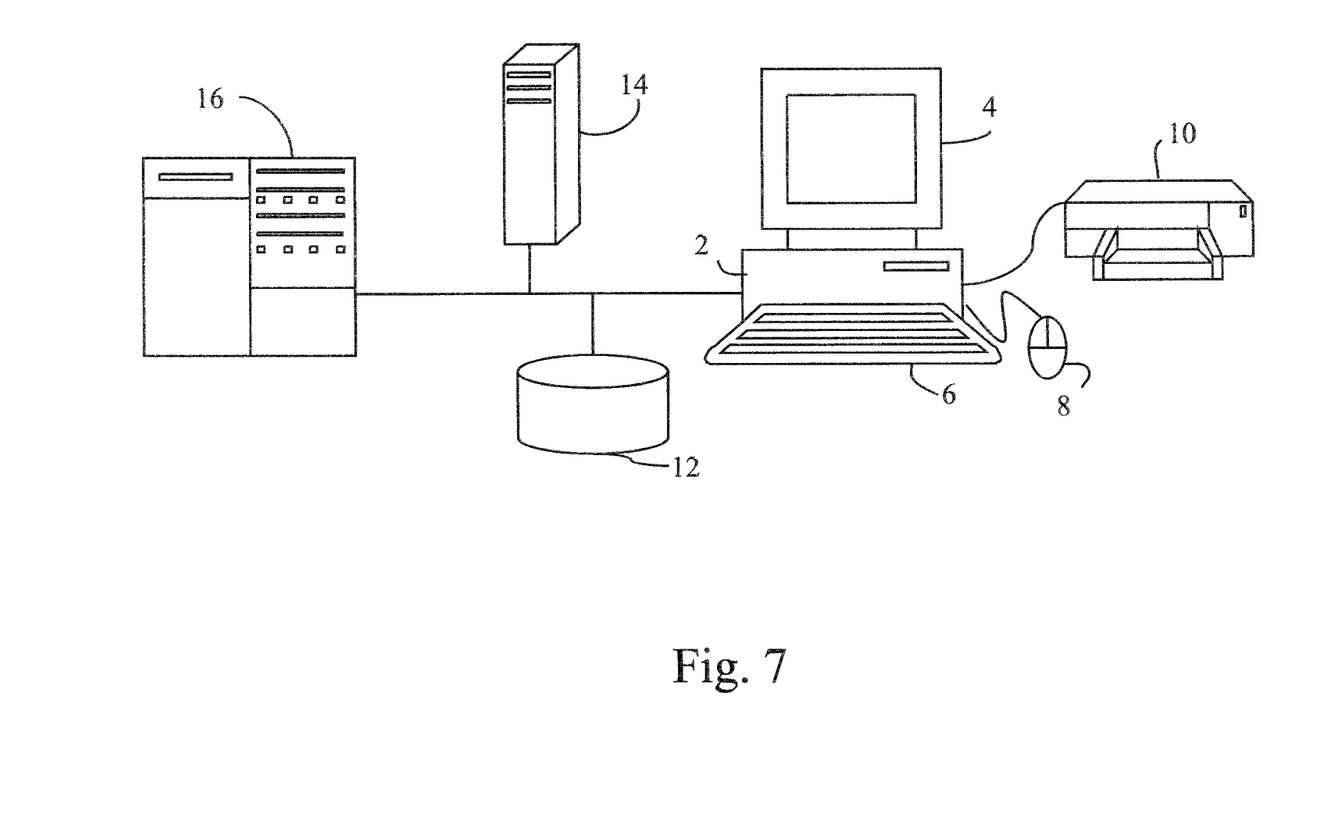
FIG. 7 illustrates an example of a computer system, in which the systems and methodologies of the present disclosure may be carried out or executed.

Referring now to FIG. 7, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for providing consolidated communications, comprising:
   receiving a transmission;
   determining whether the transmission is similar to a previous transmission by determining whether a similarity threshold is satisfied based on a count of a number of parts in common between the transmission and the previous transmission;
   computing, using a processor, a difference between the transmission and the previous transmission;
   storing an indication of the difference between the transmission and previous transmission;
   consolidating the difference into the previous transmission by modifying the previous transmission to include the difference, wherein the consolidated transmission comprises the previous transmission and the received transmission wherein the received transmission is compressed by having a same string found in the received transmission as in the previous transmission reduced into a suppressed string, and further wherein the suppressed string is associated with the same string for enabling reconstructing of the transmission from the compressed transmission; and
   indicating the previous transmission as unread,
   wherein the computing, storing, consolidating and indicating are performed responsive to determining that the transmission is similar to the previous transmission.

2. The method of claim 1, further including:
   returning a single object which includes the previous transmission, new data contained in the transmission and indication of how the new data relates to the previous transmission, the single object representing a combination of the transmission and the previous transmission in a reduced form.

3. The method of claim 1, wherein the transmission includes electronic mail, instant message, or text messaging, or combinations thereof.

4. The method of claim 1, wherein the difference includes header data, body of the transmission, or metadata associated with the transmission.

5. The method of claim 1, wherein the modifying the previous transmission further includes changing a status of the previous transmission.

6. The method of claim 5, wherein the changing status includes changing the status of the previous transmission to unread.

7. The method of claim 1, wherein the indication includes highlighting the difference.

8. The method of claim 1, wherein the indication includes reordered content.

9. The method of claim 1, further including deleting the transmission.

10. The method of claim 1, further including providing a summary associated with the transmission and the modifying.

11. The method of claim 1, further including digitally signing modified previous transmission.

12. The method of claim 1, wherein the previous transmission includes a combination of two or more previous transmissions.

13. A system for providing consolidated communications, comprising:
a processor; and
a module operable to determine whether a transmission is similar to a previous transmission by determining whether a similarity threshold is satisfied based on a count of a number of parts in common between the transmission and the previous transmission, the module further operable to compute a difference between the transmission and the previous transmission, and store an indication of the difference between the transmission and previous transmission, the module further operable to consolidate the difference into the previous transmission by modifying the previous transmission to include the difference and indicating the previous transmission as unread, wherein the consolidated transmission comprises the previous transmission and the received transmission wherein the received transmission is compressed by having a same string found in the received transmission as in the previous transmission reduced into a suppressed string, and further wherein the suppressed string is associated with the same string for enabling reconstructing of the transmission from the compressed transmission,
wherein the module computes, stores, consolidates and indicates, in response to determining that the transmission is similar to the previous transmission.

14. The system of claim 13, further including:
a storage module operable to store a plurality of transmissions and associated data.

15. The system of claim 13, wherein the module is further operable to reduce the transmission and combine the previous transmission with the reduced transmission.

16. The system of claim 13, wherein the transmission includes electronic mail, instant message, or text messaging, or combinations thereof.

17. The system of claim 13, wherein the difference includes header data, body of the transmission, or metadata associated with the transmission.

18. The system of claim 13, wherein the modifying the previous transmission further includes changing a status of the previous transmission.

19. The system of claim 18, wherein the changing status includes changing the status of the previous transmission to unread.

20. The system of claim 13, wherein the previous transmission includes a combination of two or more previous transmissions.

21. A non-transitory computer readable storage medium storing a program of instructions executable by a machine to perform a method of providing consolidated communications, comprising:
receiving a transmission;
determining whether the transmission is similar to a previous transmission by determining whether a similarity threshold is satisfied based on a count of a number of parts in common between the transmission and the previous transmission;
computing, using a processor, a difference between the transmission and the previous transmission;
storing an indication of the difference between the transmission and previous transmission; and
consolidating the transmission and the previous transmission by modifying a record of the previous transmission to include at least the difference and indicating the previous transmission as unread, wherein the consolidated transmission comprises the previous transmission and the received transmission wherein the received transmission is compressed by having a same string found in the received transmission as in the previous transmission reduced into a suppressed string, and further wherein the suppressed string is associated with the same string for enabling reconstructing of the transmission from the compressed transmission,
wherein the computing, storing, consolidating and indicating are performed responsive to determining that the transmission is similar to the previous transmission,
wherein the determining and the consolidating are performed based on at least a messages data structure that stores at least references to substrings in a message, a substring data structure that stores at least parsed substrings in the message and indexes the substrings to identifiers respectively, a consolidated messages data structure that stores at least messages that are determined to be similar according to the similarity threshold, and a filler data structure that stores labels for the substrings.

22. The non-transitory computer readable storage medium of claim 21, further including:
returning a single object which includes the previous transmission, new data contained in the transmission and indication of how the new data relates to the previous transmission, the single object representing a combination of the transmission and the previous transmission in a reduced form.

* * * * *